United States Patent
Chew et al.

(10) Patent No.: US 10,904,732 B1
(45) Date of Patent: Jan. 26, 2021

(54) METHOD FOR REAL-TIME VOTING WITHIN A PUSH TO TALK FOR THE INTERNET OF THINGS SYSTEM

(71) Applicant: MOTOROLA SOLUTIONS, INC., Chicago, IL (US)

(72) Inventors: Yen Hsiang Chew, Bayan Lepas (MY); Chin Chuan Yap, Bayan Lepas (MY); Syed Mohamed Mooulana Jamaluddin, Bangalore (IN); Lee Sun Ooi, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/775,293

(22) Filed: Jan. 29, 2020

(51) Int. Cl.
| | |
|---|---|
| *H04W 4/10* | (2009.01) |
| *H04W 4/70* | (2018.01) |
| *H04W 4/08* | (2009.01) |
| *H04W 4/029* | (2018.01) |
| *H04W 4/02* | (2018.01) |
| *H04L 29/08* | (2006.01) |

(52) U.S. Cl.
CPC ............. *H04W 4/70* (2018.02); *H04L 67/125* (2013.01); *H04W 4/023* (2013.01); *H04W 4/029* (2018.02); *H04W 4/08* (2013.01); *H04W 4/10* (2013.01)

(58) Field of Classification Search
CPC ......... H04W 4/10; H04W 4/08; H04W 76/45; H04W 4/70; H04W 4/90; H04W 84/80; H04L 12/1822; H04L 12/1813; H04L 12/1818; H04L 65/403; H04L 65/4061
USPC ...................... 455/518, 419, 420, 414.1, 517
See application file for complete search history.

(56) References Cited

U.S. PATENT DOCUMENTS

| | | | |
|---|---|---|---|
| 10,129,711 B1 | 11/2018 | Saadoun et al. | |
| 10,341,824 B1 | 7/2019 | Tov et al. | |
| 10,412,587 B1 | 9/2019 | Miller et al. | |
| 2007/0058796 A1* | 3/2007 | Schmidt | H04L 12/1813 379/202.01 |
| 2014/0324973 A1* | 10/2014 | Goel | H04L 47/70 709/204 |

* cited by examiner

Primary Examiner — Philip Sobutka (57) ABSTRACT

A method and apparatus for PTT over IoT is described herein. During operation each IoT device will be assigned to a talkgroup. Some talkgroups may have a single IoT device assigned, and other talkgroups may have multiple IoT devices assigned. During operation, an action command to control an IoT device is received over a first talkgroup. Users that are geographically near the IoT device are determined and polled as to whether or not they agree with the action command. If users near the IoT device agree to the action command, then a command is issued to a first IoT device assigned to that talkgroup.

11 Claims, 8 Drawing Sheets

METHOD FOR REAL-TIME VOTING WITHIN A PUSH TO TALK FOR THE INTERNET OF THINGS SYSTEM

BACKGROUND OF THE INVENTION

The Internet of Things (IoT) refers to the connection of every-day devices to the Internet. Devices such as cars, kitchen appliances, medical devices, doors, windows, HVAC systems, drones, . . . , etc. can all be connected through the IoT. Basically, anything that can be powered can be connected to the internet to control its functionality. The IoT allows objects to be sensed or controlled remotely across existing network infrastructure, creating opportunities for more direct integration of the physical world into computer-based systems, and resulting in improved efficiency, accuracy, and control.

Push-to-talk (PTT) devices are commonly employed by public safety personnel, air traffic controllers, emergency workers, construction site workers and others who need to be in constant and readily available voice communication. PTT, also known as press-to-transmit, is a method of communicating using half-duplex communication lines. A PTT button may be pressed to switch a device from a voice reception mode to a transmit-mode. For example, one operator may depress the PTT button on her device and speak into the device's microphone. The speech is converted into an appropriate format and transmitted to one or more other devices, where the operators of those other devices hear the first operator speak through their device's speaker.

In a two-way radio system, each PTT radio typically communicates with one group of radios (talkgroup) at a time. Even though a radio may switch between talkgroups, the radio may still only be able to communicate with a single talkgroup at a time. For example, a firefighter may be affiliated with or using a firefighter talkgroup and a police officer may be affiliated with or using a police talkgroup. Talkgroups outside of those currently listened to by a radio will not be heard by other radios or consoles. Thus, a radio speaker will only output audio from a talkgroup associated with the radio, and the radio's transmission will only be heard by those communicating on a same talkgroup.

Instead of assigning, for example, a radio channel to one particular organization (group) at a time, users are instead assigned to a logical grouping, a "talkgroup". When any user in that group wishes to converse with another user in the talkgroup, a vacant radio channel is found automatically by the system and the conversation takes place on that channel. Many unrelated conversations can occur on a channel, making use of the otherwise idle time between conversations. A control channel coordinates all the activity of the radios in the system. The control channel sends packets of data to enable one talkgroup to talk together, regardless of frequency.

Because PTT and talkgroups are so ubiquitous in the public-safety realm, it would be beneficial if PTT and talkgroups could be used to control devices for the IoT, therefore a need exists PTT for the IoT.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for PTT over IoT is described herein. During operation each IoT device will be assigned to a talkgroup. Some talkgroups may have a single IoT device assigned, and other talkgroups may have multiple IoT devices assigned. During operation, an action command to control an IoT device is received over a first talkgroup. Users that are geographically near the IoT device are determined and polled as to whether or not they agree with the action command. If users near the IoT device agree to the action command, then a command is issued to a first IoT device assigned to that talkgroup.

In a first embodiment of the present invention, a voting request will be sent to the nearby users to approve or deny the request to control the IoT device. More particularly, all users (or a predetermined number of users) within a predetermined distance to the IoT device will have to approve the request in order to trigger the IoT device.

In a second embodiment, a countdown is started when the users near the IoT device have been contacted. If at least one person denies the request before the countdown ends, the IoT device will not be triggered.

Consider the following example: A remote user performs PTT to IoT to switch off the light in a building, however there are other users in the building that still want the lights to remain ON. The users in the room will receive the voting request to accept or deny the PTT to IoT request to turn off the lights.

In one embodiment, the users geographically near (e.g., within 100 meters) the IoT device will be added to the same talkgroup used to control the IoT device for polling purposes. Keying their radio by pressing the PTT button and transmitting over the same talkgroup will constitute a "vote"

(depending on the embodiment, a vote against controlling the IoT device, or a vote for controlling the IoT device).

In a second embodiment of the present invention, the users geographically near the IoT device will be added to a newly-created talkgroup specifically used for polling purposes. Keying their radio by pressing the PTT button and transmitting over the newly-created talkgroup will constitute a "vote" (depending on the embodiment, a vote against controlling the IoT device, or a vote for controlling the IoT device).

It should be noted that the "action command" and the "vote" to control an IoT device may simply be any transmission received over a particular talkgroup, even a simple keying of a microphone, with no other voice or data transmission (i.e., the received "action command" and "vote" comprises an un-modulated carrier signal with no data or voice). In other words, sinusoidal signal that is used in the modulation is known as the carrier signal, or simply "the carrier". The signal that is used in modulating the carrier signal (or sinusoidal signal) is known as the "data signal" or the "message signal". It is important to notice that a simple sinusoidal carrier contains no information of its own, and may be used to control IoT devices as described.

However, in alternate embodiments, an "action command" and "vote" may comprise information modulated on the carrier signal, for example, the utterance of specific words, for example, "unlock the door", "turn on the lights", "yes", "no", . . . , etc. So for example, in a first embodiment, a radio tuned to a "door" talkgroup may unlock the door by simply tuning their radio to the "door talkgroup" and keying their microphone by pushing the PTT button on their radio. In a second embodiment, a radio tuned to a "door" talkgroup may unlock the door by simply tuning their radio to the "door talkgroup" and keying their microphone by pushing the PTT button on their radio, and uttering "unlock" into their radio.

In embodiments, a "vote" may comprise information modulated on a carrier signal, for example, the utterance of the word "yes" to indicate a favorable vote, and "no" to indicate an un-favorable vote; wherein the "message signal" used to modulate a carrier signal comprises the uttered word.

In alternate embodiments, a countdown is started when a radio near an IoT device has been contacted. A default vote of yes/no will be registered if the radio does not key up before the countdown timeout; however if the radio keys up before the countdown timeout, an alternate vote of no/yes will be registered instead.

In alternate embodiments, a countdown is started when a radio near an IoT device has been contacted. A default vote of "abstain" will be registered if the radio does not key up before the countdown timeout; however if the radio keys up before the countdown timeout, an alternate vote of "yes" (or "no") will be registered instead.

In alternate embodiments, a countdown is started when a radio near an IoT device has been contacted. A default vote of "abstain" will be registered if the radio does not key up before the countdown timeout; however if the radio keys up before the countdown timeout, a "yes" vote or a "no" vote may be transmitted by speaking into the radio's microphone while holding the PTT button.

As an example, consider a public-safety officer that is approaching a room with a locked door. The public-safety officer can initiate a PTT call to the talkgroup that includes all actuators for the door, and the door of the room can be opened. If a light for the room is in the same talkgroup, then the light can be switched on with the same PTT call.

Those individuals near the device(s) trying to be controlled by the public-safety officer may be determined by determining a location of a radio assigned to the individuals. The individuals may be polled as to whether or not they agree with the door being unlocked and/or the lights being switched on. The polling may comprise a simple polling message sent to the nearby users (e.g., "request to turn on lights, if you do not agree, key your radio").

Figure 1:
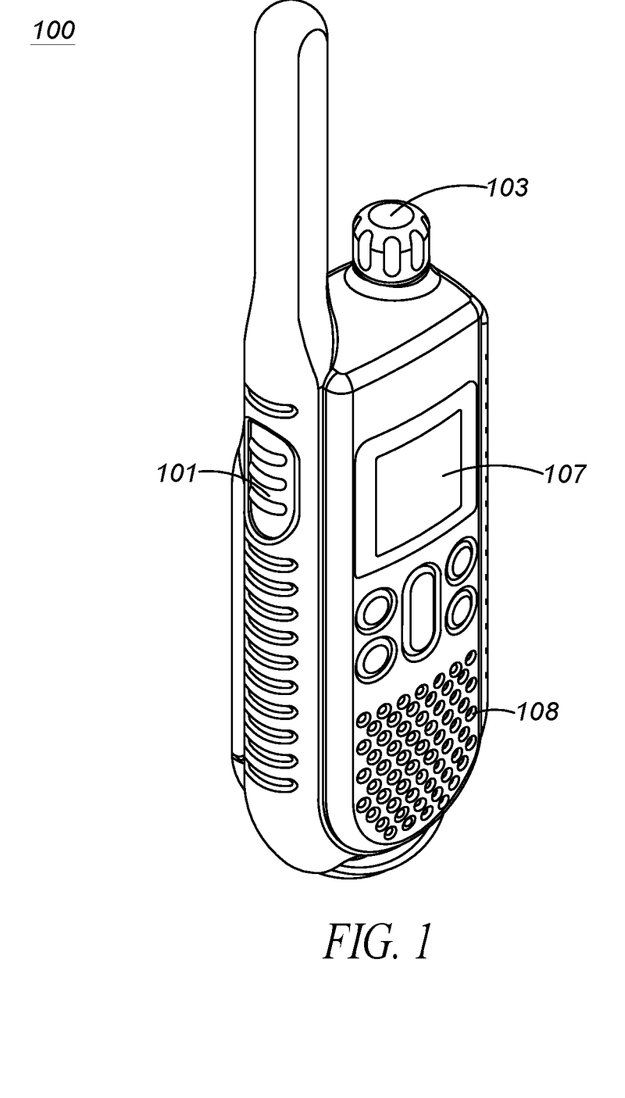
FIG. 1 illustrates push-to-talk (PTT) radio.

FIG. 1 illustrates push-to-talk (PTT) radio 100. As shown, radio 100 comprises PTT button 101, knob 103, display/screen 107, and speaker/microphone 108. PTT button 101 comprises a standard button, that when pressed, transitions radio 100 from a listening state, to a transmit state, transmitting over a specific talkgroup. Display 107 comprises a way of conveying (e.g., displaying) PTT information to the user. In particular, in an embodiment, a talkgroup may be displayed to the user as an alpha-numeric output on display 107. Display 107 may simply comprise a liquid-crystal display (LCD), or may comprise additional types of displays (e.g., a light-emitting diode (LED) display). Display 107 may also comprise a touch-screen display that provides both an output interface and an input interface between the device and a user. Display 107 may also provide graphics, video, and any combination thereof.

Speaker/microphone combination 108 comprises a standard speaker for outputting audio and a standard microphone for receiving audio (voice). More particularly, speaker 108 converts an electrical signal generated from an active application to human-audible sound waves and microphone 108 converts sound waves to electrical signals for transmission.

Knob 103 serves as a way to control the volume of speaker 108, and also serves as a means for switching between talkgroups. Knob 103 is approximately a cylindrical object. Knob 103 can alternatively be implemented as a variety of different objects, including conical shapes, spherical shapes, dials, cubical shapes, rods, etc., and may have a variety of different textures on their surfaces, including bumps, lines, or other grips, or projections or members extending from the circumferential surface.

The user 201 (shown in FIG. 2) preferably grips or contacts the circumferential surface of knob 103 and rotates it a desired amount to scroll through menu items, for example, talkgroups that may be selected. Once knob 103 is rotated to select a particular talkgroup, any activation (pushing) of the PTT button 101 will cause radio 100 to communicate over the selected talkgroup.

Figure 2:
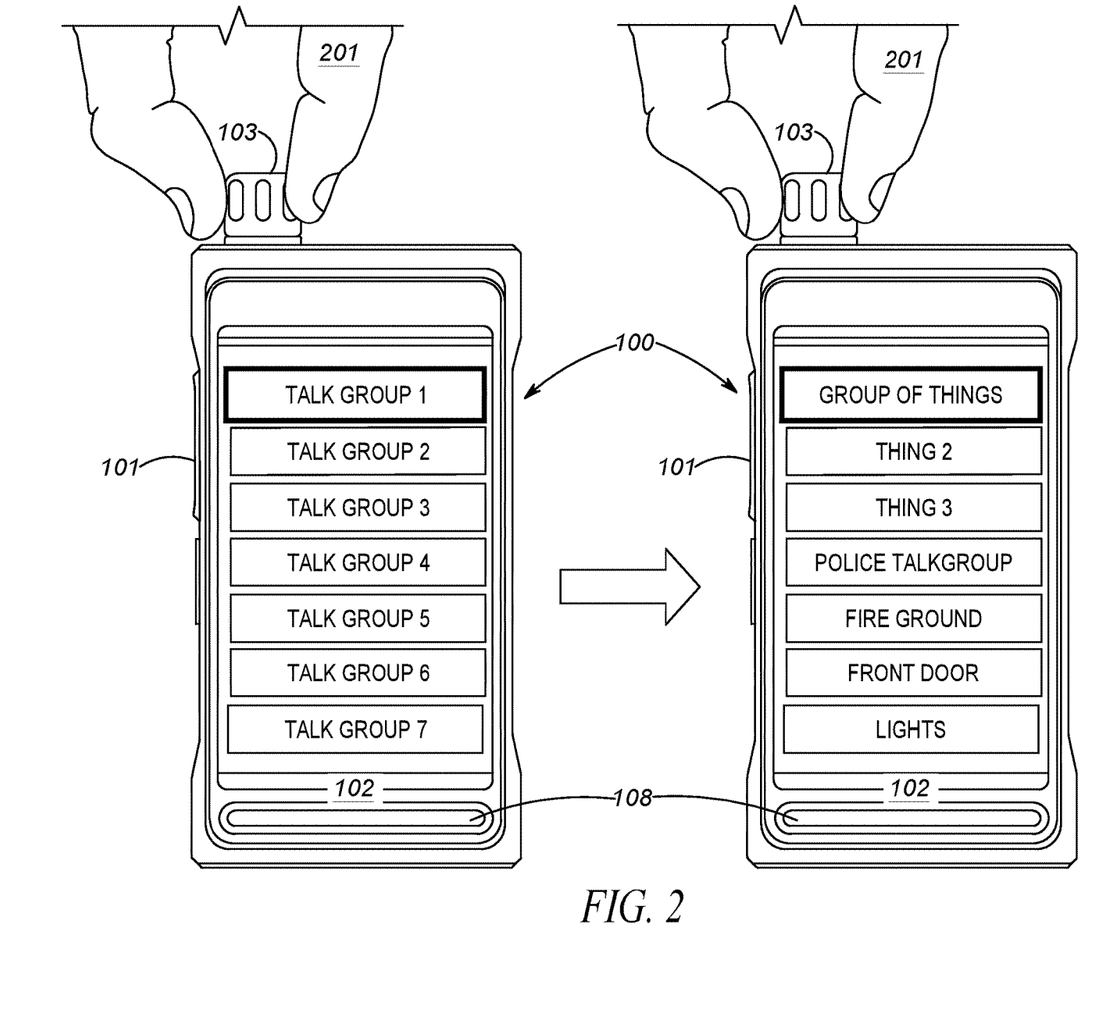
FIG. 2 illustrates push-to-talk (PTT) radio.

It should be noted that display 102 may display the names of the talkgroups, which include the names of IoT devices that are controlled by pushing the PTT button. For example, as shown in FIG. 2, the Police Talkgroup and the Fire ground talkgroup may be displayed, so when selected, communications to other police officers, or firemen take place upon the pushing of the PTT button 101. However, as shown, IoT devices may also be displayed, such as Front Door, Lights, Group of Things, Thing 2, Thing 3, . . . , etc. When an IoT device is selected, activation of the PTT button will cause the IoT device (or the group of devices) to function.

In order to accomplish the above, a PTT-to-Things Server is provided that is a member of IoT talkgroups. Communication to the PTT-to-Things server over a particular talkgroup causes the PTT-to-Things server to map the talkgroup to a particular IoT device (or group of IoT devices), and potentially to a particular protocol to control an IoT device. The PTT-to-Things server then instructs the particular IoT device to perform an action.

As is known in the art, modern two-way radio systems comprise talkgroups, where it is possible for a radio to be a member of any combination of talkgroups. As a member of a talkgroup, a radio may receive transmissions from, as well as transmit to all members of the talkgroup. Transmission and reception of information to radios outside of an assigned talkgroup is generally not performed. Illustratively, a radio assigned to an ambulance may be a member of a Fire & Rescue talkgroup as well as a Law Enforcement talkgroup. Therefore, the radio may communicate with all members of the Fire & Rescue talkgroup as well as the Law Enforcement talkgroup. In the present invention, server 301 is provided that is a member of talkgroups that are assigned to a "thing" connected to the IoT. This is illustrated in FIG. 3.

Figure 3:
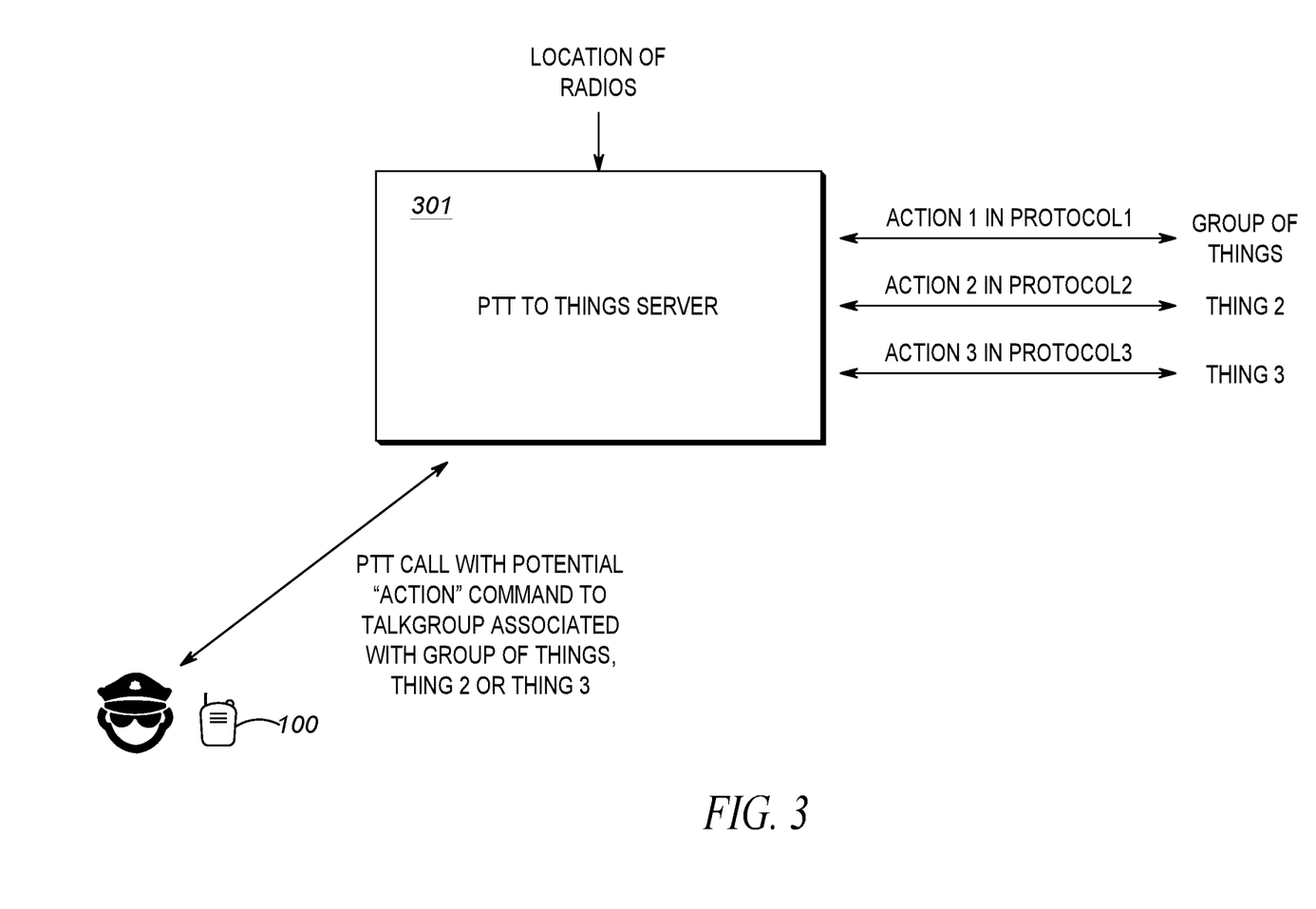
FIG. 3 illustrates a PTT-to-Things server.

As shown in FIG. 3, PTT-to-Things server 301 is shown in communication with radio 100. PTT-to-Things server 301 is a member of a plurality of talkgroups. When PTT-to-Things server 301 receives a PTT call over a particular talkgroup to which it is a member, PTT-to-Things server 301 will map the particular talkgroup to an IoT device, and potentially a particular IoT protocol. PTT-to-Things server 301 will then communicate with the IoT device to cause the IoT device to perform a particular action.

As is known in the art, a particular communication protocol (IoT protocol) may be used for each IoT device. For example, various proprietary protocols such as DNP, Various IEC**** protocols (IEC 61850 etc. . . . ), bacnet, EtherCat, CANOpen, Modbus/Modbus TCP, EtherNet/IP, PROFI-BUS, PROFINET, DeviceNet, . . . , etc. can be used. Also a more generic protocol such as Coap, SOAP, Mqtt, and RESTfull may also be used.

As mentioned above, an action command may be received by PTT-to-Things server 301 as part of the PTT call over the particular talkgroup. PTT-to-Things server 301 may analyze the action command (which in a preferred embodiment comprises a voice command) and additionally map the action command to an instruction given to the IoT device.

PTT-to-Things server 301 will be provided locations of radios as part of normal operation. Server 301 will determine those radios near the IoT device that a user is attempting to control and join those radios to a single talkgroup. As mentioned above, the talkgroup may comprise the particular talkgroup, or a new talkgroup may be created for voting purposes.

PTT-to-Things server 301 will then send a polling message to all radios near the IoT device that a user is attempting to control that notifies the radios of the attempt and requests a vote. If PTT-to-Things server receives a vote against controlling the IoT device, then PTT-to-Things server 301 will not send any instruction to the IoT device.

In a further embodiment, after polling/voting takes place, and no vote against controlling the IoT device was received, then a first instruction may be provided to the IoT device upon detecting transmission upon the particular talkgroup, and a second instruction may be provided to the IoT device upon detecting that no further transmission is being received on the talkgroup. (It should be noted that "transmission" comprises simply opening up the channel (transmitting the carrier signal) by pushing the PTT button, no voice needs to be detected). As an example, a user may switch their radio to a talkgroup associated with lighting in a room. Pushing and holding the PTT button may cause the lights to go on, while un-pressing the PTT button may cause the lights to go off. This entails PTT-to-Things server 301 to send an instruction to the lights to turn on upon detecting any transmissions on a particular talkgroup (even the carrier), and then instructing the lights to go off upon detecting that transmissions on a particular talkgroup has ceased.

Figure 4:
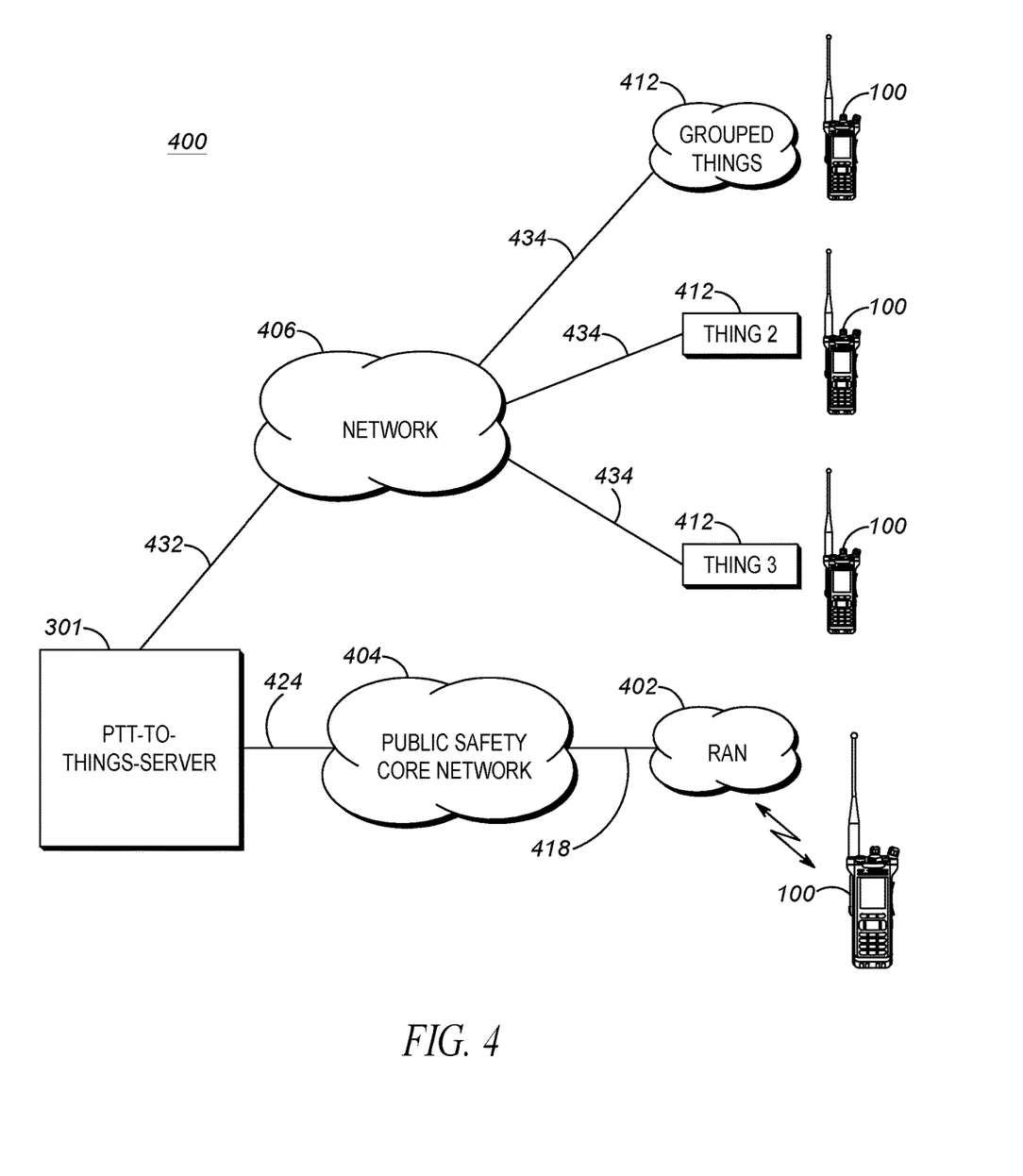
FIG. 4 depicts an example communication system that incorporates a PTT-to-Things server.

FIG. 4 depicts an environment 400 that incorporates PTT-to-Things server 301. It should be noted that the communication system depicted in FIG. 4 comprises a typical public-safety communication system modified with a PTT-to-Things server. However one of ordinary skill in the art would recognize that other system may be modified to encompass PTT-to-Things server 301 such as, but not limited to a cellular communication system, a cloud-based communication system, . . . , etc. Environment 400 includes one or more radio access networks (RANs) 402, a public-safety core network 404, PTT radios 100, IoT devices 412, PTT-to-Things server 301, and communication links 418, 424, 432, and 434.

RAN 402 includes typical RAN elements such as base stations, base station controllers (BSCs), routers, switches, and the like, arranged, connected, and programmed to provide wireless service to user equipment (e.g., radio 100, and the like) in a manner known to those of skill in the relevant art. RAN 402 may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, RAN 402 may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, RAN 402 may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

Public-safety core network 404 may include one or more packet-switched networks and/or one or more circuit-switched networks, and in general provides one or more public-safety agencies with any necessary computing and communication needs, transmitting any necessary public-safety-related data and communications.

For narrowband LMR wireless systems, core network 404 operates in either a conventional or trunked configuration. In either configuration, a plurality of communication devices is partitioned into separate groups (talkgroups) of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (e.g., talkgroups). Thus, all groups are served by all channels. The trunked radio system works to take advantage of the probability that not all groups need a traffic channel for communication at the same time.

Group calls may be made between wireless and/or wireline participants in accordance with either a narrowband or a broadband protocol or standard. Group members for group calls may be statically or dynamically defined. That is, in a first example, a user or administrator may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., join a group call having a particular talkgroup ID) with each of the pre-designated participants in the defined group. In another example, communication devices may dynamically affiliate with a group (and also disassociate with the group) perhaps based on user input, and the switching and/or radio network may track group membership and route new group calls according to the current group membership.

Radios 100 may be any suitable computing and communication device configured to engage in wireless communication with the RAN 402, and ultimately to PTT-to-Things server 301 over the air interface as is known to those in the relevant art. It should also be noted that any one or more of the communication links 418, 424, 432, and 434 could include one or more wireless-communication links and/or one or more wired-communication links.

Expanding on the above, each user of the system may possess a radio to communicate over many differing talkgroups. Communication on various talkgroups will be routed by RAN 402 and network 404 to PTT-to-Things server 301. When PTT-to-Things server 301 receives a communication over a particular talkgroup from any radio 100, PTT-to-Things server 301 will map the particular talkgroup to an IoT device 412. Communication to a particular IoT device 412 (or group of devices if multiple IoT devices 412 are associated with the same talkgroup) will take place via communication links 432/434 and intervening network 406.

Network 406 preferably comprises one of many networks used to transmit data, such as but not limited to a network employing one of the following protocols: a Long Term Evolution (LTE) protocol, LTE-Advance protocol, or 5G protocol including multimedia broadcast multicast services (MBMS) or single site point-to-multipoint (SC-PTM) protocol over which an open mobile alliance (OMA) push to talk (PTT) over cellular protocol (OMA-PoC), a voice over IP (VoIP) protocol, an LTE Direct or LTE Device to Device protocol, or a PTT over IP (PoIP) protocol, a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

With the above in mind, PTT-to-Things server 301 may also be configured with a natural language processing (NLP) engine (not shown in FIG. 4) configured to determine an "action command" from any over-the-air voice transmissions received by radio 100. The NLP engine may also analyze oral queries and/or statements received by any user and provide responses to the oral queries and/or take other actions in response to the oral statements. It should be noted that any over-the-air communication between users (e.g., on the talkgroup) will be monitored by the NLP engine in order to determine the content of the over-the-air voice transmission.

Figure 5:
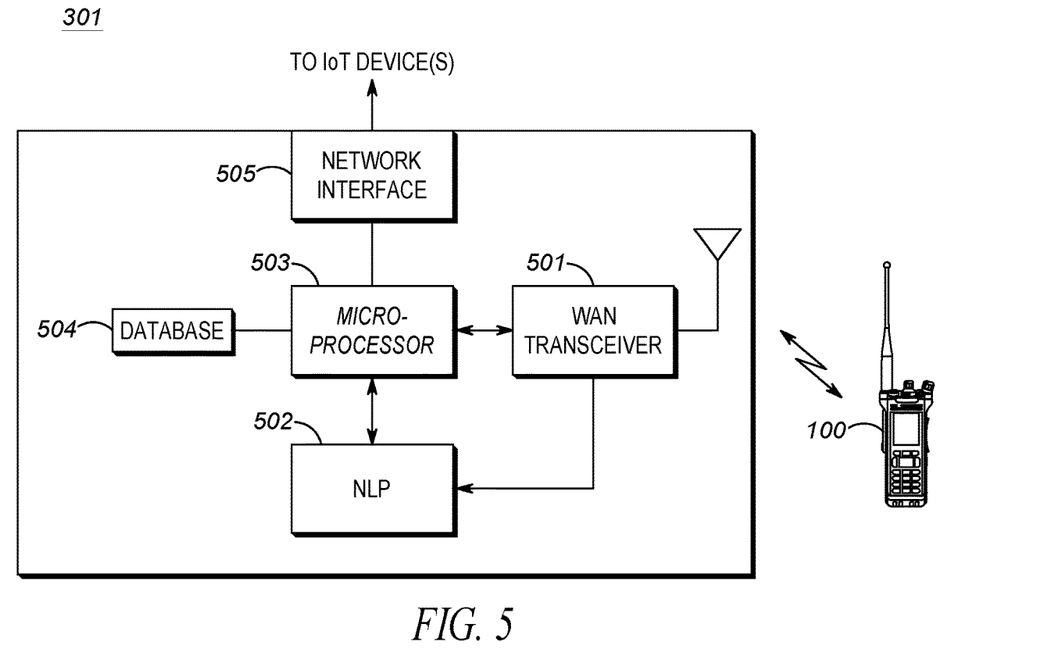
FIG. 5 is a block diagram of a PTT-to-Things server.

FIG. 5 is a block diagram PTT-to-Things server 301. In an embodiment, PTT-to-Things server 301 is embodied within a dispatch center, however in alternate embodiments the device may be embodied within the public-safety core network 404, or more computing devices in a cloud compute cluster (not shown), or some other communication device not illustrated in FIG. 4, and/or may be a distributed communication device across two or more entities.

FIG. 5 shows those components (not all necessary) for PTT-to-Things server 301 to receive a communication from a radio using a particular talkgroup, map the particular talkgroup to an IoT device(s), and send an appropriate command to the IoT device. For ease of illustration some components have been left out of FIG. 5. For example, a graphical user interface that provides the dispatch operator necessary information about public-safety officers is not shown since that component is not necessary for understanding the following discussion.

As shown, PTT-to-Things server 301 may include a wide-area-network (WAN) transceiver 501 (e.g., a transceiver that utilizes a public-safety communication-system protocol), Natural Language Processor (NLP) 502, logic circuitry 503, database 504, and network interface 505. In other implementations, PTT-to-Things server 301 may include more, fewer, or different components. Regardless, all components are connected via common data busses as known in the art.

WAN transceiver 501 may comprise well known long-range transceivers that utilize any number of network system protocols. (As one of ordinary skill in the art will recognize, a transceiver comprises both a transmitter and a receiver for transmitting and receiving data). For example, WAN transceiver 501 may be configured to utilize a next-generation cellular communications protocol operated by a cellular service provider, or any public-safety protocol such as an APCO 25 network or the FirstNet broadband network. WAN transceiver 501 receives communications from users over a particular talkgroup. It should be noted that WAN transceiver 501 is shown as part of PTT-to-Things server 301, however, WAN transceiver 501 may be located in RAN 402 (e.g., a base station of RAN 402), with a direct link to PTT-to-Things server 301.

NLP 502 may be a well-known circuitry to analyze, understand, and derive meaning from human language in a smart and useful way. By utilizing NLP, automatic summarization, translation, named entity recognition, relationship extraction, sentiment analysis, speech recognition, and topic segmentation can take place.

Logic circuitry 503 comprises a digital signal processor (DSP), general purpose microprocessor, a programmable logic device, or application specific integrated circuit (ASIC) and is configured to map a talkgroup to an IoT device(s), and alternatively also map a talkgroup and potentially a received utterance to a command given to an IoT device. For example, consider a public-safety officer that is approaching a room with a locked door. The public-safety officer can initiate a PTT call using a particular talkgroup. WAN transceiver may detect the transmission and provide the transmission to logic circuitry 503. Logic circuitry 503 can (via mapping) determine that the talkgroup is associated with the locked door. Logic circuitry 503 then can instruct all actuators for the door to be opened (after the voting process).

The mapping process preferably comprises an operation that associates each element of a given set (the domain) with one or more elements of a second set (the range). The talkgroup and potentially an action command comprises the domain, while the IoT device and command the range. The mapping is preferably explicit based on predefined rules (e.g., reception over talkgroup 423 is mapped to a specific internet address for door lock 1, reception over talkgroup 223 is mapped to a specific internet address for door lock 2, . . . , etc.).

As discussed above, prior to logic circuitry 503 controlling the IoT device, (e.g., instructing all actuators for the door to be opened), logic circuitry 503 may determine a location of the IoT device, and determine if any radios 100 are within a predetermined distance to the IoT device (e.g., 100 feet). This is preferably accomplished by logic circuitry continuously being provided location data (as known in the art) for radios 100 and storing this location data within database 504. Additionally, database 504 will comprise a location of all IoT devices that are capable of being controlled by server 301. The location data stored for each radio 100 will be compared to the location of the IoT device that a user is attempting to control to determine those radios 100 within a predetermined distance to the IoT device a user is attempting to control.

Once the nearby devices are determined, PTT-to-Things server 301 may dynamically regroup the talkgroup used to control the IoT device to include the radios nearby the IoT device, and send a voting request to the nearby radios. Alternatively, a new talkgroup may be created and a voting request sent to the nearby radios over the new talkgroup. (A voting request does not need to be sent to the radio attempting to control the IoT device). Any transmission over the talkgroup by the nearby radios may constitute a "no" vote. In another embodiment of the present invention the transmission over the talkgroup by a nearby radio may comprise a "yes" vote. Regardless, each radio that is added to the "polling" talkgroup will be sent a message telling the user of the attempted use of the IoT device, and giving the user an opportunity to stop the IoT device from being controlled.

Regardless if transmission over the talkgroup comprises a "no" or a "yes" vote, logic circuitry 503 will determine if any nearby device voted against the controlling of the IoT device. If so, the IoT device will not be controlled. In other words, if any nearby device wishes that the IoT device is not triggered, then no actuation of the IoT device will take place.

Database 504 is provided. Database 504 comprises standard memory (such as RAM, ROM, . . . , etc) and serves to store talkgroup/IoT device pairs along with the location of each IoT device. Database 504 may also comprise a list of radios and their locations. Database 504 may also store talkgroup/IoT device pairs along with action command/action taken pairs. This is illustrated in Tables 1 and 2 below:

TABLE 1

Mapping of talkgroup to device and instruction when no verbal action command is used

| Talk group | Device | Instruction (control command) | Address of IoT device |
| --- | --- | --- | --- |
| 4320 | Lock at the Police Station | Switch from lock to unlock, or vice versa | 10.66.123 |
| 4356 | Light at the Police Station | Switch light from off to on or vice versa | 10.66.124 |
| 6748 | Air conditioning at the Police Station | Turn air conditioning from off to on or vice versa | 10.66.125 |
| . . . | . . . | . . . | . . . |

TABLE 2

Mapping of talkgroup to device and instruction when action command is used

| Talk group | Device | Verbal Action Command | Instruction (control command) | Address of IoT device |
| --- | --- | --- | --- | --- |
| 4320 | Lock at the Police Station | unlock | Switch from lock to unlock | 10.66.124 |
| 4320 | Lock at the Police Station | lock | Switch from unlock to lock | 10.66.124 |
| 4356 | Light at the Police Station | off | Turn light off | 10.66.125 |
| 4356 | Light at the Police Station | on | Turn light on | 10.66.125 |
| . . . | . . . | . . . | . . . | . . . |

Finally, network interface 505 provides processing, modulating, and transceiver elements that are operable in accordance with any one or more standard or proprietary wireless interfaces, wherein some of the functionality of the processing, modulating, and transceiver elements may be performed by means of the logic circuitry 503 through programmed logic such as software. Examples of network interfaces (wired or wireless) include Ethernet, T1, USB interfaces, IEEE 802.11b, IEEE 802.11g, etc.

With the above in mind, FIG. 5 illustrates an apparatus 301 comprising logic circuitry 503 configured to receive a talkgroup identification that identifies a talkgroup that is associated with an Internet-of-Things (IoT) device, map the talkgroup identification to the IoT device, and determine radios nearby the IoT device. Logic circuitry 503 causes the radios nearby the IoT device to be added to a polling talkgroup by sending a dynamic regroup request to infrastructure equipment (e.g., core network 404 or RAN 402) through interface 505. WAN transceiver 501 then receives voting to trigger the IoT devices from the radios nearby the IoT device, wherein the authorization is received over the polling talkgroup. The voting is passed to logic circuitry 503. Logic circuitry 503 then determine a control command based on the IoT device when the voting is positive (i.e., no device voted against operating the IoT device). In another embodiment, the voting is positive when all or a subset (e.g. a majority) of devices 100 in the polling talkgroup voted in favor of operating the IoT device. In can be appreciated by those skilled in the art that a positive vote may comprise of any suitable combination of "yes", "no" and "abstain" votes from devices 100 in the polling talkgroup.

Network interface 505 is also provided, and coupled to the logic circuitry, the network interface configured to output the control command to operate the IoT device based on the voting to trigger the IoT devices from the radios nearby the IoT device.

Database 504 is provided comprising a mapping of the talkgroup to the IoT device. The database may also comprise a location of the IoT device, and a location of radios. In addition, the database may also comprise a mapping of action command and control command to the IoT device.

As discussed above, the talkgroup identification is received from an over-the-air, push-to-talk communication over the talkgroup. Additionally, the voting comprises a transmission over the polling talkgroup. In one embodiment of the present invention the talkgroup and the polling talkgroup comprises a same talkgroup.

Figure 6:
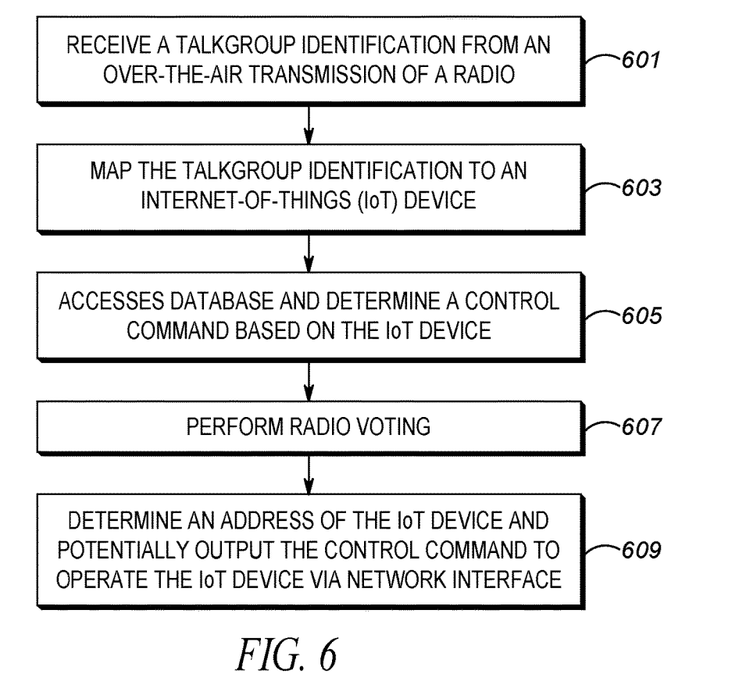
FIG. 6 is a flow chart showing operation of the PTT-to-Things server of FIG. 5.

FIG. 6 is a flow chart showing operation of the PTT-to-IoT server of FIG. 5. The logic flow begins at step 601 where logic circuitry 503 receives a talkgroup identification from an over-the-air transmission of a radio. At step 603, logic circuitry 503 maps the talkgroup identification to an Internet-of-Things (IoT) device (maps the talkgroup identification to an address for an IoT device). The mapping is preferably done by accessing database 504 and retrieving the mappings as shown in Table 1 and Table 2. At step 605, logic circuitry 503 accesses database 504 and determines a control command based on the IoT device. Logic circuitry 503 then determines devices nearby the IoT device and performs radio voting as described above (step 607). When the voting allows, logic circuitry 503 also determines an address of the IoT device and outputs the control command to operate the IoT device via network interface 505 (step 609).

As discussed above, a verbal action command may be received from the over-the-air transmission; and the step of determining the control command further comprises determining the control command based on both the IoT device and the verbal action command.

Finally, the talkgroup identification preferably is received from a push-to-talk transmission over the talkgroup from the radio.

As discussed above, each IoT device may be mapped to a specific talkgroup, so that reception on a first talkgroup initiates an action to a first IoT device, and reception on a second talkgroup initiates an action on a second IoT device. This is illustrated in the logic flow of FIG. 7.

Figure 7:
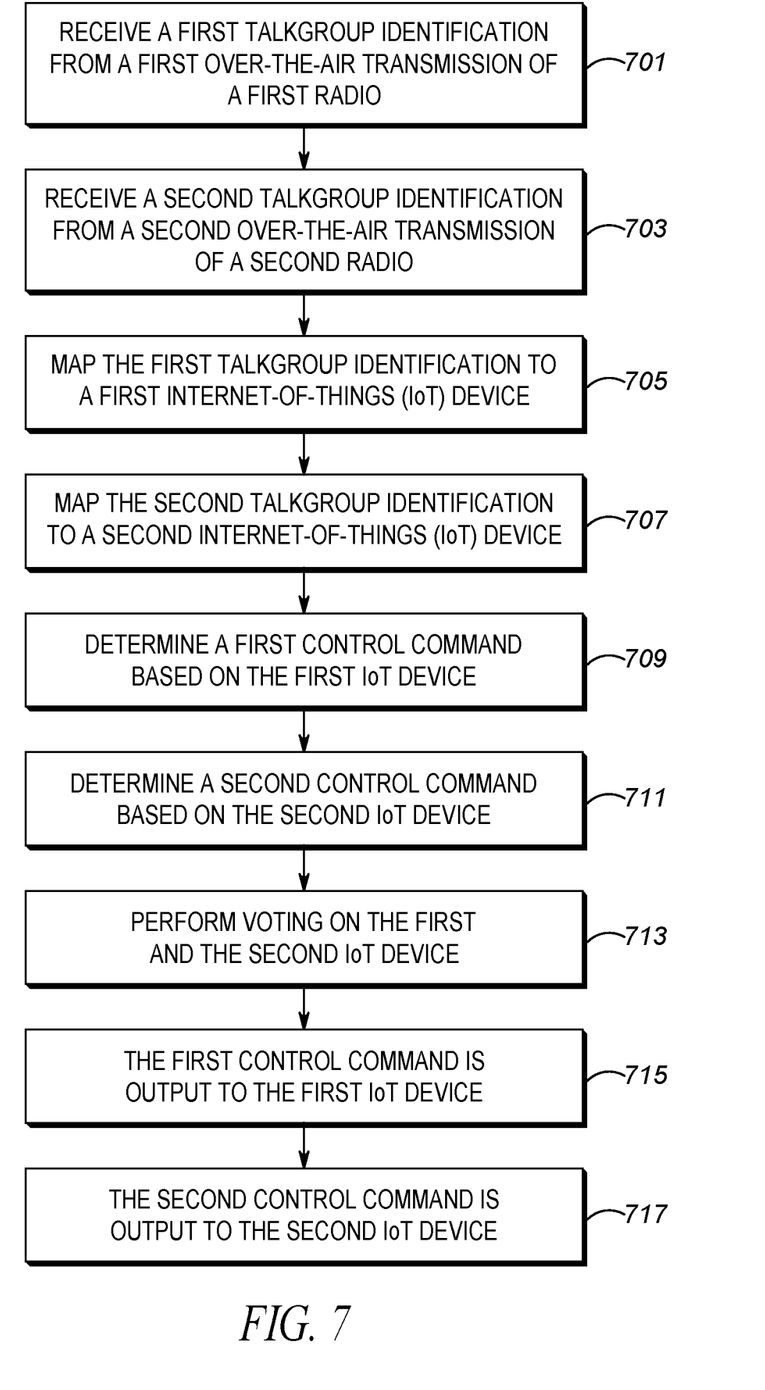
FIG. 7 is a flow chart showing operation of the PTT-to-Things server of FIG. 5.

The logic flow begins at step 701 where logic circuitry 503 receives a first talkgroup identification from a first over-the-air transmission of a first radio. At step 703, logic circuitry 503 receives a second talkgroup identification from a second over-the-air transmission of a second radio. Logic circuitry 503 then maps the first talkgroup identification to a first Internet-of-Things (IoT) device (step 705) and maps the second talkgroup identification to a second IoT device (step 707). Logic circuitry then determines a first control command based on the first IoT device (step 709) and determines a second control command based on the second IoT device (step 711). Voting is then performed on the first and the second IoT device (step 713). When voting allows, the first control command is output to the first IoT device (step 715) and the second control command is output to the second IoT device (step 717).

As discussed above, the first control command may comprise a control command from a first control protocol, and the second control command may comprise a control command from a second control protocol, differing from the first control protocol, with the first IoT device differing from the second IoT device.

Logic circuitry 503 may also receive a first verbal action command from the first over-the-air transmission of the first radio and a second verbal action command from the second over-the-air transmission of the second radio. When this occurs, the step of determining the first control command further comprises determining the first control command based on both the first IoT device and the first verbal action command, and the step of determining the second control command further comprises determining the second control command based on both the second IoT device and the second verbal action command.

PTT to IoT Voting

When radio 100 transmits over any talkgroup, a particular identification (ID) of the radio is provided with the communication. The ID uniquely identifies the radio. The identification of the radio can be associated with its operator (e.g., Officer Bob currently operates radio 010020). This identification may be simply sub-audible data included with the transmission, or may comprise information received on a separate data channel. Therefore, when PTT-to-Things server 301 receives a communication over a particular talkgroup, it can also receive an ID of any radio sending the transmission.

As discussed above, each radio within environment 400 periodically provides location and location updates to server 301. Additionally, database 504 comprises a location of each IoT device within environment 400. With this in mind, logic circuitry 503 can determine which (if any) radios are nearby any IoT device wishing to be controlled by a user.

A mechanism for a user to "vote" on whether or not to control the IoT device is provided by determining those individuals within a predetermined distance of the IoT device, and then joining them to the IoT talkgroup (or a newly-created talkgroup). The IoT talkgroup (or new talkgroup) now comprises the user's radio attempting to control the IoT device and radios that are nearby the IoT device that a user is attempting to control. The nearby users can then have the choice to activate the device or not.

Considering the above, when a first user communicates on a "things" talkgroup in order operate a thing, the PTT-to-Things server may identify a second user that is nearby the "thing". The PTT-to-Things server then adds the second user to the things talkgroup (or a new talkgroup). The PTT-to-Things server can then receive a vote on whether or not to operate the "thing" from the nearby user. The PTT-to-Things server then removes the nearby user (that was previously added) from the things talkgroup (or new talkgroup).

It should be noted that PTT-to-Things server may add the nearby user to the "things" talkgroup, or to a new talkgroup by sending a request to core network 404 to perform a "dynamic regrouping". As known in the art, with the dynamic regrouping feature, server 301 can seamlessly cause users to be added to a group without any intervention from radio operators.

Consider the following example of the above: Officer Jack is in the field and sprained his ankle. Officer Jack attempts to summon a PTT-to-IoT automobile to pick him up by communicating over a particular talkgroup associated with the automobile (e.g., talkgroup 18728). PTT-to-IoT sever 301 will add any users near the automobile (e.g., Commander Dudi) to talkgroup 18728. Server 301 can update officer Dudi on the situation (Officer Jack attempting to control automobile), or alternatively Officer Jack can provide the necessary information to Officer Dudi over the talkgroup. For example, the server may state that, "Officer Jack requests automobile to pick him up. Commander Dudi, do you agree?"

When verbal action commands are being utilized to operate a PTT-to-IoT device, Officer Jack and Commander Dudi may have a conversation over the talkgroup associated with the automobile. Commander Dudi then can give the appropriate action command to have the automobile routed to Officer Jack's location. Alternatively, when simply keying the radio causes the IoT device to act, Commander Dudi can then simply key the radio to approve the request. (It should be noted that in this case, it is assumed a side conversation between officer Jack and Commander Dudi can take place over another communication talkgroup (i.e., other than talkgroup 18728). Alternatively, Commander Dudi may authorize Officer Jack to be added to those nearby to operate the IoT device.

Figure 8:
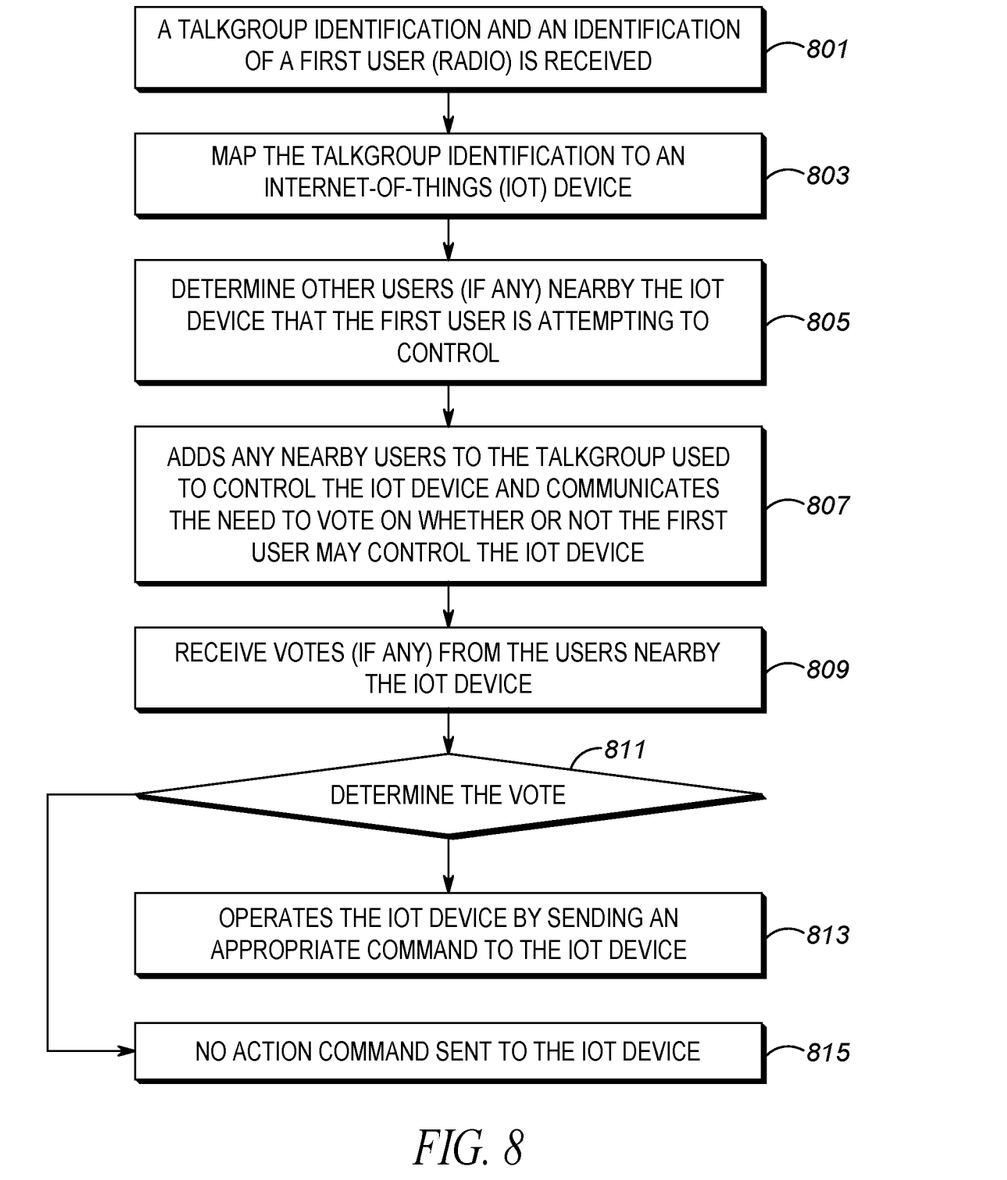
FIG. 8 is a flow chart showing operation of the PTT-to-Things server of FIG. 5.

The logic flow illustrated in FIG. 8 shows those steps (not all necessary) for server 301 to perform voting on actuating an IoT device. The logic flow begins at step 801 where a talkgroup identification and an identification of a first user (radio) is received. Particularly, the talkgroup identification and identity is received from radio 100 via an over-the-air transmission. The reception takes place at WAN transceiver 501 and is passed to logic circuitry 503. Thus, logic circuitry 503 receives the talkgroup identification and identity from WAN transceiver 501.

After the talkgroup identification is received, the logic flow continues to step 803 where logic circuitry 503 maps the talkgroup identification to an Internet-of-Things (IoT) device. As discussed above, this can be accomplished by logic circuitry 503 accessing database 504 to access Table 1 or Table 2.

At step 805, logic circuitry 503 determines other users (if any) nearby the IoT device that the first user is attempting to control. This can be accomplished by accessing database 504 to determine the location of the IoT device, and the location of all users within environment 400.

The logic flow continues to step 807 where logic circuitry adds any nearby users to the talkgroup used to control the IoT device (or a newly-created talkgroup) and communicates the need to vote on whether or not the first user may control the IoT device.

At step 809, WAN transceiver 501 receives votes (if any) from the users nearby the IoT device and passes them to logic circuitry 503. The logic flow then continues to step 811 where logic circuitry 503 determines if the vote was a "yes" or a "no" vote. If the vote was a "yes" vote, then logic circuitry 503 operates the IoT device by sending an appropriate command to the IoT device through network interface 505 (step 813), otherwise the logic flow simply ends at step 815 with no action command being sent to the IoT device.

Figure 9:
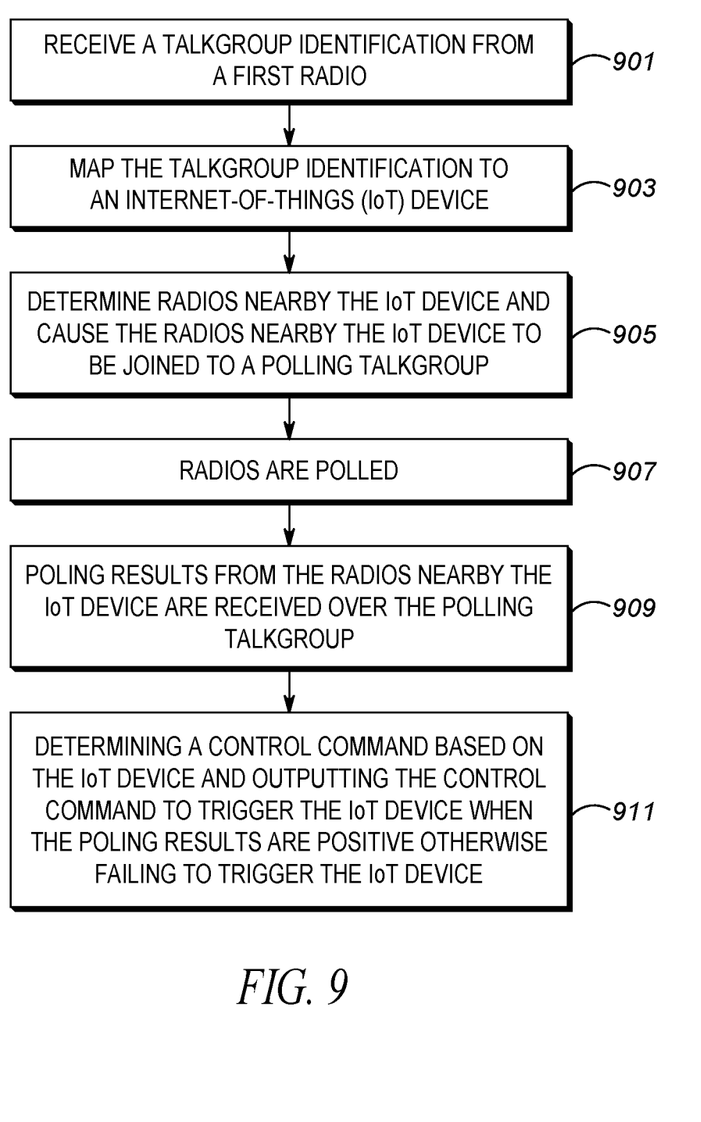
FIG. 9 is a flow chart showing operation of the PTT-to-Things server of FIG. 5.

FIG. 9 is a flow chart showing operation of server 310. The logic flow begins at step 901 where WAN receiver 501 receives a talkgroup identification from a first radio and passes the talkgroup identification to logic circuitry 503. As discussed, the talkgroup identification that identifies a first talkgroup. At step 903, logic circuitry 503 maps the talkgroup identification to an Internet-of-Things (IoT) device, wherein the mapping determines the IoT device based on the received talkgroup identification.

Logic circuitry 503 then determines radios nearby the IoT device by, for example, accessing database 504 (step 905) and causes the radios nearby the IoT device to be joined to a polling talkgroup. The radios are then polled over the polling talkgroup as to whether or not the IoT device should be triggered (step 907) and poling results from the radios nearby the IoT device are received over the polling talkgroup (step 909).

At step 911, logic circuitry 503 determining a control command based on the IoT device and outputting the control command to trigger (operate) the IoT device when the poling results are positive (e.g. no device voted against triggering the IoT device) otherwise failing to trigger the IoT device.

As discussed above the first talkgroup and the polling talkgroup may be a same talkgroup. Additionally, the talkgroup identification is received from a push-to-talk transmission from the first radio. Finally, the step of receiving the pole results comprises the step of receiving the poll results from a push-to-talk transmission of the radios nearby the IoT device.

In the foregoing specification, specific embodiments have been described. However, one of ordinary skill in the art appreciates that various modifications and changes can be made without departing from the scope of the invention as set forth in the claims below. For example, the above description provided a user nearby an IoT device to vote on whether or not the IoT device should be activated by "voting". As discussed the voting takes place by sending a transmission over a voting talkgroup/a polling talkgroup. The voting may simply be keying a radio to indicate a yes or a no. However, the voting may be more specific, for example, speaking "yes" or "no", or simply keying the radio for a "no" vote . . . etc. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   logic circuitry configured to:
      receive a talkgroup identification that identifies a first talkgroup that is associated with an Internet-of-Things (IoT) device;
      map the first talkgroup identification to the IoT device;
      receive a control command referencing the IoT device;
      determine radios nearby the IoT device;
      cause the radios nearby the IoT device to be added to a second talkgroup;
      receive voting to trigger the IoT devices from the radios nearby the IoT device, wherein the voting is received over the second talkgroup;
      determine a control command based on the IoT device; and
   a network interface coupled to the logic circuitry, the network interface configured to output the control command on the first talkgroup to operate the IoT device based on the voting received over the second talkgroup to trigger the IoT devices from the radios nearby the IoT device.

2. The apparatus of claim 1 further comprising:
   a Wide-Area-Network (WAN) transceiver receives the voting to trigger the IoT devices from the radios nearby the IoT device, and passes the voting on to the logic circuitry.

3. The apparatus of claim 1 further comprising a database comprising a mapping of the first talkgroup to the IoT device.

4. The apparatus of claim 3 wherein the database further comprises a location of the IoT device, and a location of radios.

5. The apparatus of claim 1 wherein the talkgroup identification was received from an over-the-air, push-to-talk communication over the first talkgroup.

6. The apparatus of claim 1 wherein the voting comprises a transmission over the second talkgroup.

7. A method comprising the steps of:
   receiving a talkgroup identification from a first radio that identifies a first talkgroup;
   mapping the talkgroup identification to an Internet-of-Things (IoT) device, wherein the mapping determines the IoT device based on the received talkgroup identification;
   determining radios nearby the IoT device;
   joining the radios nearby the IoT device to a second talkgroup;
   second the radios nearby the IoT device over the second talkgroup as to whether or not the IoT device should be triggered;
   receiving poling results from the radios nearby the IoT device over the second talkgroup; and
   determining a control command based on the IoT device and outputting the control command to operate the IoT device when the poling results are positive otherwise failing to trigger the IoT device.

8. The method of claim 7 wherein the first talkgroup and the second talkgroup are a same talkgroup.

9. The method of claim 7 wherein the talkgroup identification is received from a push-to-talk transmission from the first radio.

10. The method of claim 9 wherein the step of receiving the pole results comprises the step of receiving the poll results from a push-to-talk transmission of the radios nearby the IoT device.

11. An apparatus comprising:
    logic circuitry configured to:
       receive a talkgroup identification that identifies a first talkgroup that is associated with an Internet-of-Things (IoT) device;
       map the talkgroup identification to the IoT device;
       determine radios nearby the IoT device;
       cause the radios nearby the IoT device to be added to a second talkgroup;
       receive voting to trigger the IoT devices from the radios nearby the IoT device, wherein the voting is received over the second talkgroup;
       determine a control command based on the IoT device;
    a network interface coupled to the logic circuitry, the network interface configured to output the control command to operate the IoT device based on the voting to trigger the IoT devices from the radios nearby the IoT device;
    a Wide-Area-Network (WAN) transceiver configured to receive the voting to trigger the IoT devices from the radios nearby the IoT device, and passes the voting on to the logic circuitry;
    a database comprising a mapping of the first talkgroup to the IoT device wherein the database further comprises a location of the IoT device, and a location of radios;
    wherein the first talkgroup identification was received from an over-the-air, push-to-talk communication over the first talkgroup; and wherein the voting comprises a transmission over the second talkgroup.

\* \* \* \* \*

UNITED STATES PATENT AND TRADEMARK OFFICE
CERTIFICATE OF CORRECTION

| | | |
|---|---|---|
| PATENT NO. | : 10,904,732 B1 | Page 1 of 1 |
| APPLICATION NO. | : 16/775293 | |
| DATED | : January 26, 2021 | |
| INVENTOR(S) | : Chew et al. | |

It is certified that error appears in the above-identified patent and that said Letters Patent is hereby corrected as shown below:

On the Title Page

(72) Inventors should read: Yen Hsiang Chew , Bayan Lepas ( MY ) ; Chin Chuan Yap , Bayan Lepas ( MY ) ; Syed Mohamed Moulana Jamaluddin , Bangalore ( IN ) ; Lee Sun Ooi , Bayan Lepas ( MY )

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*